United States Patent
Warner (10) Patent No.: US 6,550,655 B2
(45) Date of Patent: Apr. 22, 2003

(54) SECURING DEVICE FOR PERSONAL PAGERS

(76) Inventor: Shirley Warner, 15435 Apple Ridge Rd., Missouri City, TX (US) 77459

( * ) Notice: Subject to any disclaimer, the term of this patent is extended or adjusted under 35 U.S.C. 154(b) by 33 days.

(21) Appl. No.: 09/894,146

(22) Filed: Jun. 28, 2001

(65) Prior Publication Data

US 2002/0008126 A1 Jan. 24, 2002

Related U.S. Application Data

(63) Continuation-in-part of application No. 09/282,965, filed on Mar. 31, 1999.

(51) Int. Cl.[7] .............................. A45C 15/00; A45F 5/00
(52) U.S. Cl. ...................... 224/575; 224/271; 224/272; 224/666; 224/930; 24/3.7; 24/3.12
(58) Field of Search ................................. 224/575, 182, 224/194, 666, 668, 676, 679, 255, 271, 272, 930; 24/3.1, 3.7, 3.12

(56) References Cited

U.S. PATENT DOCUMENTS

| | | | | |
|---|---|---|---|---|
| 1,795,963 A | * | 3/1931 | Oborski | 224/182 |
| 2,461,095 A | * | 2/1949 | Truxell | 224/179 |
| 2,526,768 A | * | 10/1950 | Pendergrass | 224/182 |
| 4,083,481 A | * | 4/1978 | Selinko | 224/269 |
| 4,458,384 A | * | 7/1984 | Arnold | 206/5 |
| 5,081,709 A | * | 1/1992 | Benyo et al. | 224/669 |
| 5,274,318 A | * | 12/1993 | Nordberg et al. | 224/242 |
| 5,385,282 A | * | 1/1995 | Chen | 224/269 |
| 5,388,741 A | * | 2/1995 | Hillinger | 206/349 |
| 5,443,193 A | * | 8/1995 | Lenard | 206/81 |
| 5,598,926 A | * | 2/1997 | Vogt | 206/37 |
| 5,664,292 A | * | 9/1997 | Chen | 24/3.11 |
| 5,791,019 A | * | 8/1998 | Jeong | 224/670 |
| 5,829,102 A | * | 11/1998 | Conti | 24/3.1 |
| 5,979,019 A | * | 11/1999 | Johnson | 224/269 |

FOREIGN PATENT DOCUMENTS

JP 4187102 * 7/1992 ................. 24/3.1

* cited by examiner

Primary Examiner—Stephen K. Cronin
(74) Attorney, Agent, or Firm—John D. Gugliotta (57) ABSTRACT

Disclosed is a securing device for personal pagers consisting of a plastic holster-type device that includes interchangeable securing means for attaching it to the clothes of the user. The present invention includes a conventional belt clip for attaching to belts and the like as well as a locking straight pin, either of which can be used at any one given time. The incorporation of the pin allows the user to attach the pager to virtually any article of clothing in a secure manner in a situation where the belt clip would be insufficient.

4 Claims, 15 Drawing Sheets

SECURING DEVICE FOR PERSONAL PAGERS

RELATED APPLICATIONS

The present invention is a Continuation in Part of U.S. Ser. No. 09/282,965, filed on Mar. 31, 1999.

BACKGROUND OF THE INVENTION

1. Field of the Invention

The present invention relates generally to personal paging devices, and more specifically to a securing device that allows for the transportation of personal pagers in a convenient and accessible manner using interchangeable clamping and pin-on securing mechanisms.

2. Description of the Related Art

Modern communications have made great strides in recent years, especially in the area of personal, portable electronics. Among these devices, personal pagers or beepers are extremely popular. Named after conventional paging systems used at fixed locations, use of the pager allows one to get in contact with the user at virtually any location simply by using a telephone. One simply dials the telephone number of the pager, enters the number from which he or she is calling and hangs-up. Using a network of satellite and radio transmissions, the information is conveyed to the pager, causing it to beep or vibrate, and alerting the user that they have a message pending. The user then contacts the individual wishing to get in contact with them by dialing the telephone number displayed on the beeper. While this is an effective means by which to remain in contact with certain individuals at all times, it does suffer from one main drawback. Use of the pager requires that it be attached to the user's person at all times in order to be used effectively. Pagers typically incorporate the use of a belt clip to facilitate easy attachment to a belt or pants, however these clips tend to break and they do not lend well to attaching to other types of garments, especially women's clothing. Accordingly, there is a need for a means by which a conventional pager or beeper can be effectively secured to the user's clothing regardless of the type of clothes being worn. The development of the present invention fulfills this need.

A search of the prior art did not disclose any patents that read directly on the claims of the instant invention. However, several references to devices related to the use and securement of personal paging devices were discovered. These devices neither anticipate nor disclose any embodiment that would preclude the novelty and the utilitarian functionality of the features of the present invention.

The following patents describe various clip-on mounting system for pagers.

U.S. Pat. No. 5,690,262, issued in the name of Vardanega;

U.S. Pat. No. 5,528,770, issued in the name of Castilla et al.;

U.S. Pat. No. 5,499,429, issued in the name of Higginbotham; and

U.S. Pat. No. 5,261,122, issued in the name of Otsuki et al.

U.S. Pat. No. 5,140,726, issued in the name of Wu et al., discloses a safety pin device.

U.S. Pat. No. 4,477,946, issued in the name of Mafli, discloses a safety pin device for affixing flowers to a dress or similar article.

The following two patents describe a safety pin fastener device for a badge, broach, or the like:

U.S. Pat. No. 4,188,688, issued in the name of d'Orgelys; and

U.S. Pat. No. 4,030,166, issued in the name of Betters.

While several features exhibited within these references may be incorporated into this invention, alone and in combination with other elements, the present invention is sufficiently different so as to make it distinguishable over the prior art.

SUMMARY OF THE INVENTION

The present invention is a securing device for personal pagers consisting of a plastic holster-type device that includes interchangeable securing means for attaching it to the clothes of the user. It provides the conventional belt clip for attaching to belts and the like as well as a locking straight pin, either of which can be used at any one given time. The incorporation of the pin allows the user to attach the pager to virtually any article of clothing in a secure manner. The holster is of an open design that allows the pager to be slid and inserted therein, securing it with a spring-biased friction fit. Thus, when the pager alerts the user of a message, it can be removed from the holster for viewing the telephone number. In an alternate embodiment, the interchangeable clamping and straight pin mechanisms are incorporated into the design of a paging device electronics housing, thus eliminating the separate, holster-type design. Regardless of the particular embodiment, the present invention provides a convenient, reliable means by which to carry a pager that is easy to use on any type of clothing.

It is therefore an object of the present invention to provide a securing device for personal pagers that allows the user to interchangeably choose between a clamping-type and locking straight pin securing mechanism.

It is another object of the present invention to provide a securing device for personal pagers that includes a holster that allows a conventional paging device to be removably placed therein.

It is another object of the present invention to provide a securing device for personal pagers wherein the securing mechanism is built into the electronics housing of the paging device.

Finally, It is an object of the present invention to provide a securing device for personal pagers that can be attached to a variety of garments and materials.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
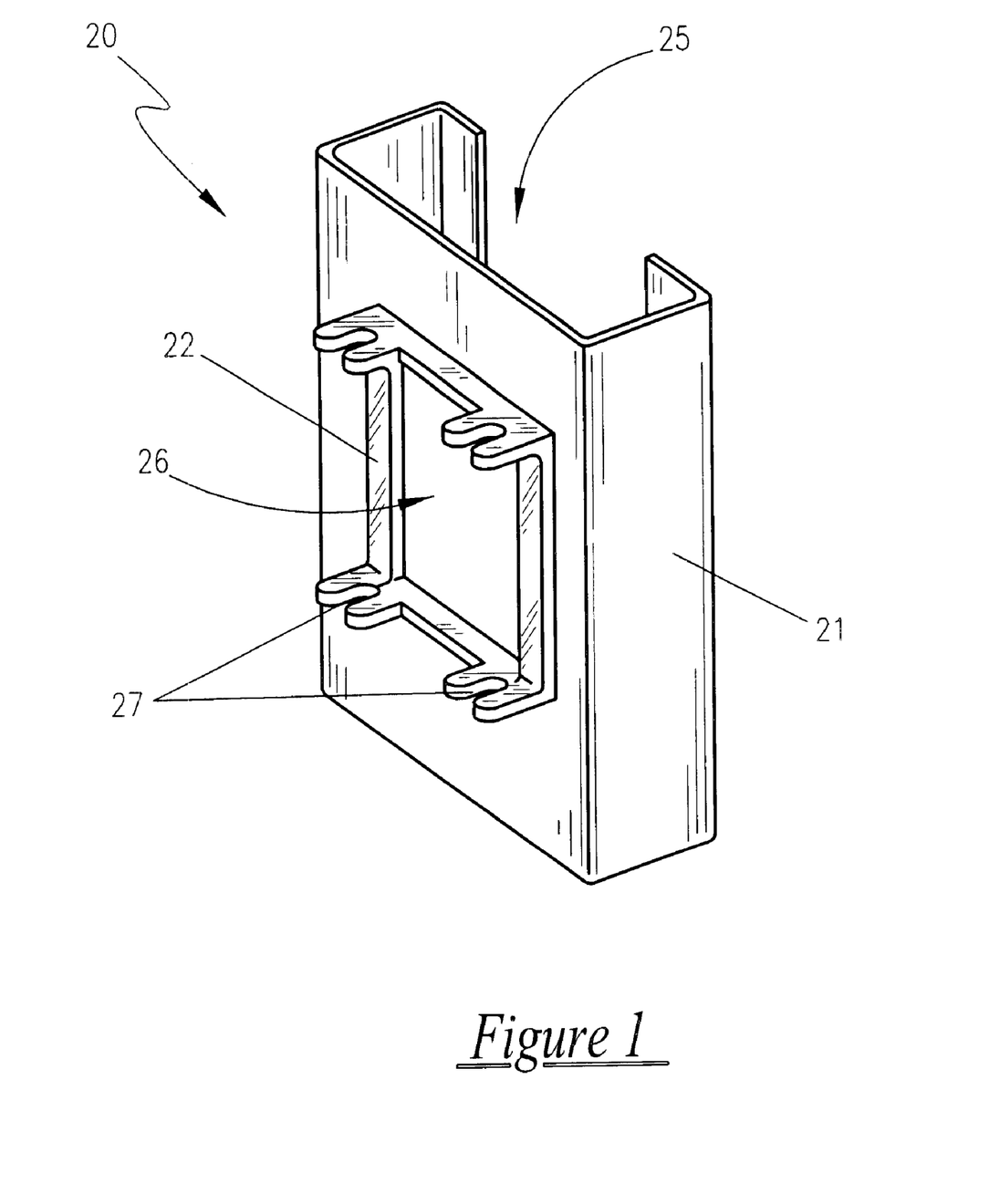
FIG. 1 is a perspective view of a securing device for personal pagers, according to the preferred embodiment of the present invention.
Figure 2:
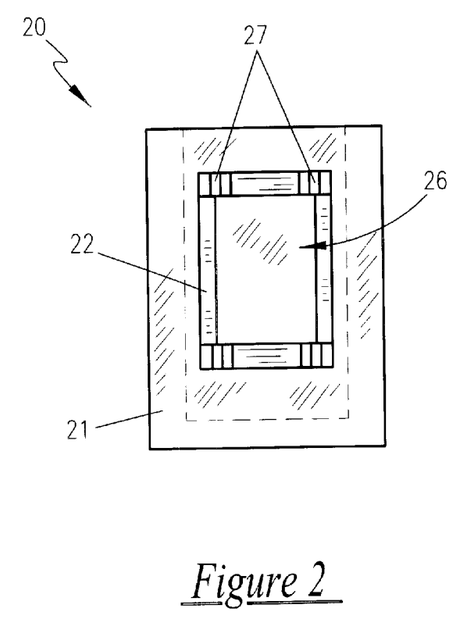
FIG. 2 is a rear plan view of a securing device for personal pagers, according to the preferred embodiment of the present invention.
Figure 3:
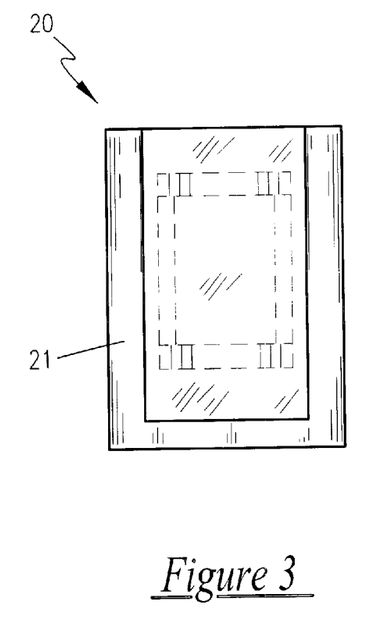
FIG. 3 is a front plan view of a securing device for personal pagers, according to the preferred embodiment of the present invention.
Figure 4:
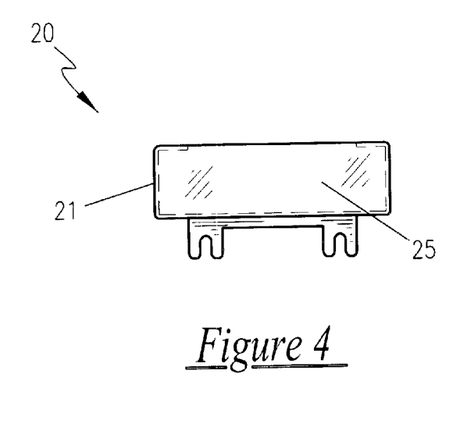
FIG. 4 is a top plan view of a securing device for personal pagers, according to the preferred embodiment of the present invention.
Figure 5:
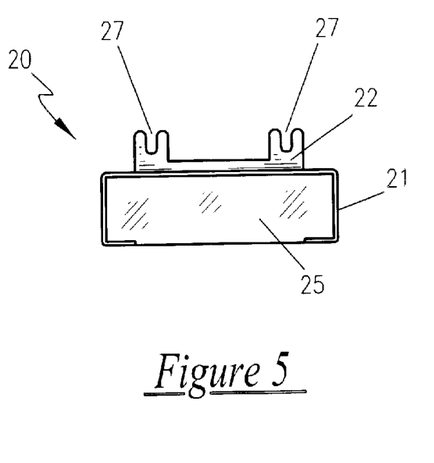
FIG. 5 is a bottom plan view of a securing device for personal pagers, according to the preferred embodiment of the present invention.
Figure 6:
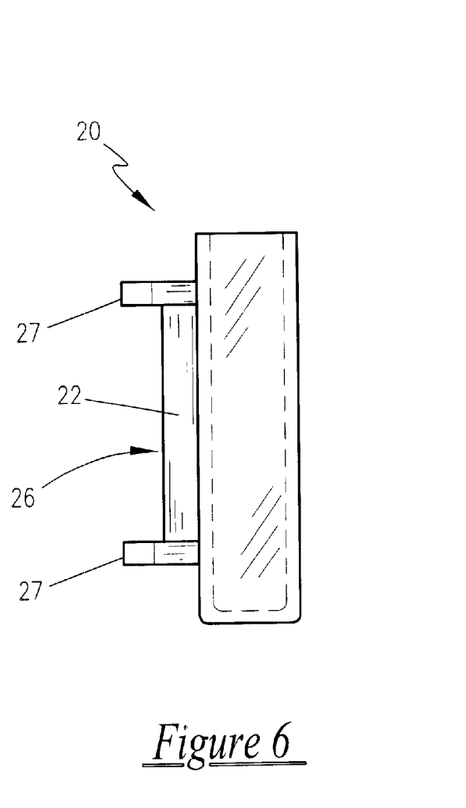
FIG. 6 is a left side plan view of a securing device for personal pagers, according to the preferred embodiment of the present invention.
Figure 7:
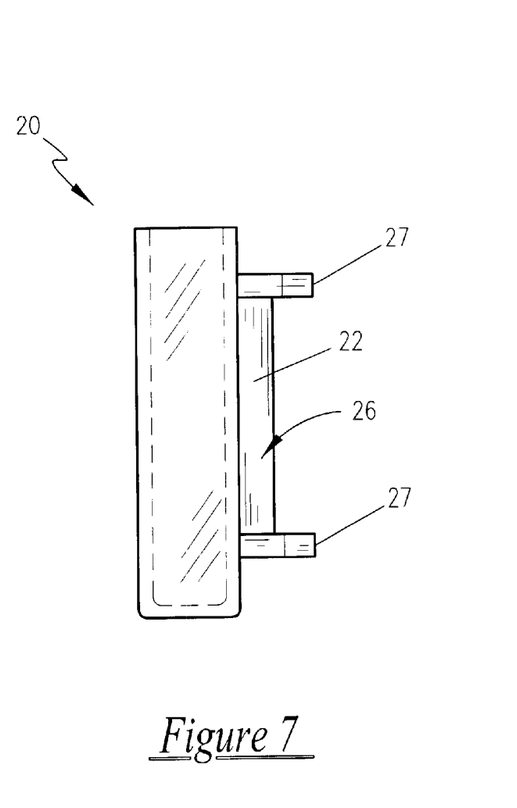
FIG. 7 is a right side plan view of a securing device for personal pagers, according to the preferred embodiment of the present invention.
Figure 8:
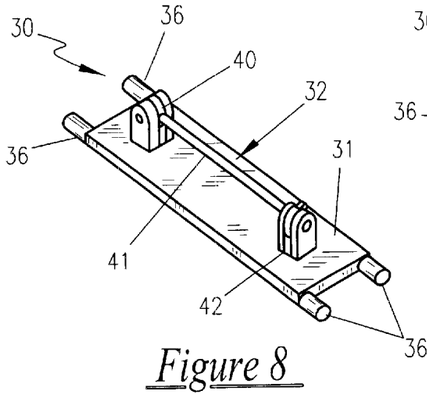
FIG. 8 is a perspective view of a straight pin attachment for use with the securing device for personal pagers, according to the preferred embodiment of the present invention.
Figure 9:
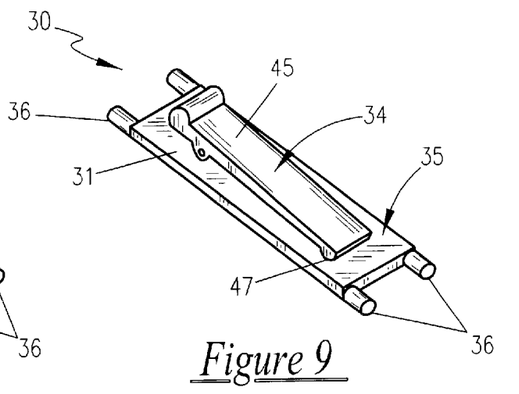
FIG. 9 is a perspective view of a belt clip attachment for use with the securing device for personal pagers, according to the preferred embodiment of the present invention.
Figure 10:
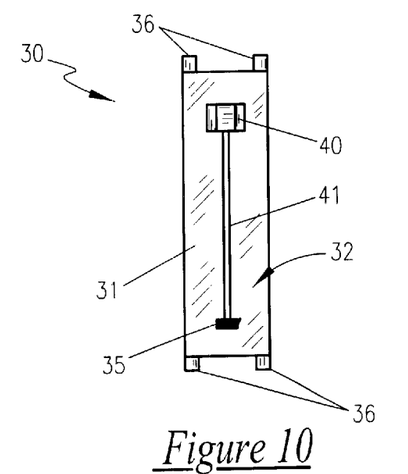
FIG. 10 is a front plan view of a straight pin attachment for use with the securing device for personal pagers, according to the preferred embodiment of the present invention.
Figure 11:
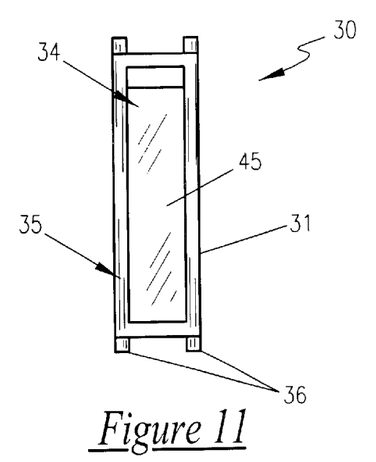
FIG. 11 is a rear plan view of a straight pin attachment for use with the securing device for personal pagers, according to the preferred embodiment of the present invention.
Figure 12:
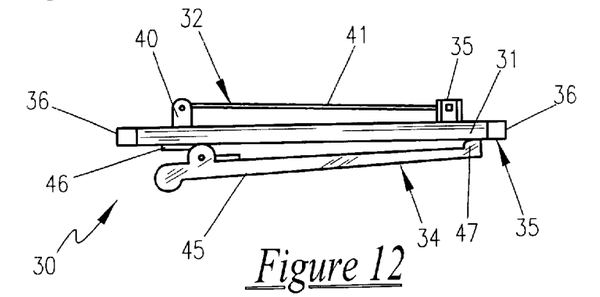
FIG. 12 is a perspective view of a belt clip attachment for use with the securing device for personal pagers, according to the preferred embodiment of the present invention.

Referring now to FIG. 1, depicted is the securing device for personal pagers, hereinafter pager securing device 20, according to the preferred embodiment of the present invention. The pager securing device 20 consists of a holster 21 for securably supporting a personal pager device (not shown in this figure) therein and a securing attachment 22 for attaching the holster and the personal pager device to an article of clothing or the like.

Referring now to FIGS. 1–7, depicted is the holster 21 portion of the pager securing device 20, according to the preferred embodiment of the present invention. The holster 20 is generally rectangular in shape and forms a pager receiving cavity 25 into which a personal paging device (not shown in these figures) can be placed in a secure manner. A securing attachment receiving slot 26 allows for the interchangeable connectivity of various securing attachments 22 such as the straight pin/belt clip securing device 30. The securing attachments 22 are held in place within the securing attachment receiving slot 26 by a retaining cavity 27. The function of the securing attachments 22 in conjunction with the securing attachment receiving slot 26 will be described in further detail herein below.

Referring now to FIGS. 8–11, depicted is a straight pin/belt clip securing device 30 for use in conjunction with the pager securing device 20, according to the preferred embodiment of the present invention. The straight pin/belt clip securing device 30 consists of a straight pin securing base 31 that supports a conventional straight pin device 32, oriented along the longitudinal dimension thereof. The straight pin device 32 consists of a hinge mechanism 40 that provides pivotal support for a straight pin 41. A clasp mechanism 42 allows for securing the straight pin 41 in the closed position, as depicted in the figures. A straight pin retaining tab 36 is attached to the straight pin securing base 31 on the side opposite the straight pin device 32. The straight pin retaining tab 36 secures straight pin securing device 30 within the securing attachment receiving cavity 27. The function of the straight pin retaining tab 36 in conjunction with the securing attachment receiving cavity 27 will be discussed in further detail herein below.

Figure 22:
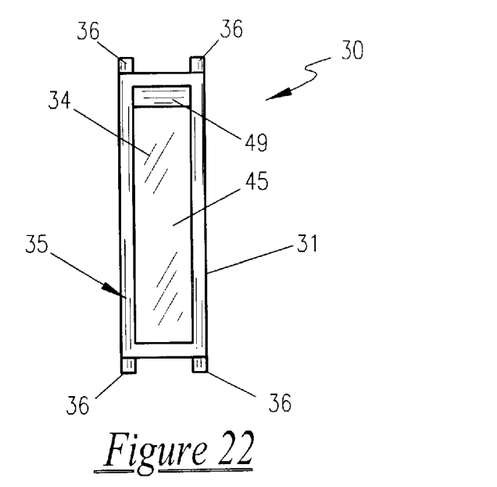
FIG. 22 is a rear plan view of a straight pin attachment for use with the securing device for personal pagers, according to the first preferred alternate embodiment of the present invention.
Figure 23:
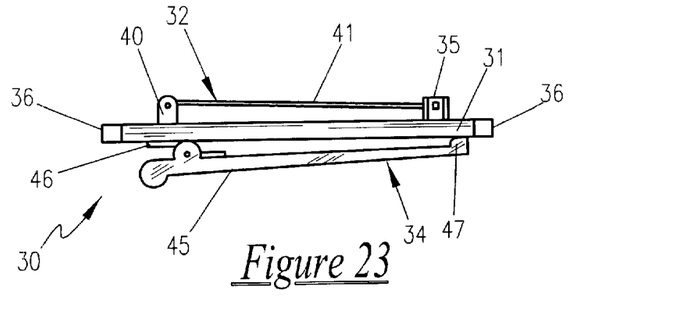
FIG. 23 is a perspective view of a straight pin attachment for use with the securing device for personal pagers, according to the first preferred alternate embodiment of the present invention.
Figure 24:
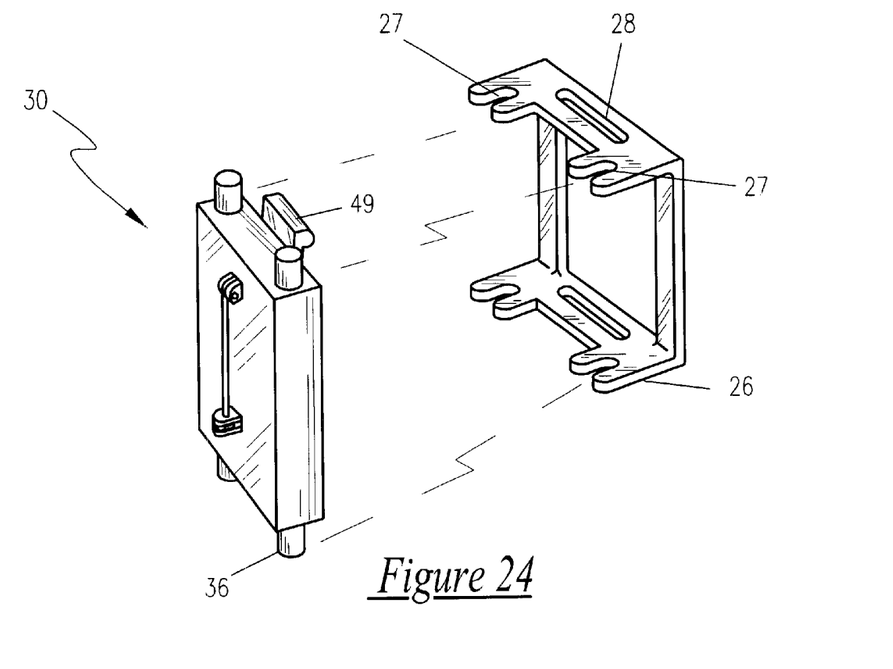
FIG. 24 is an exploded perspective view of a straight pin attachment for use with the securing device for personal pagers, according to the second preferred alternate embodiment of the present invention.
Figure 25:
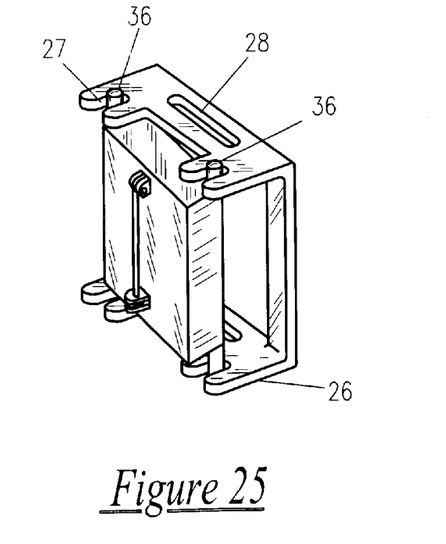
FIG. 25 is a perspective view of a straight pin attachment installed in the securing device for personal pagers configured so that the straight pin device is the chosen attachment means, according to the second preferred alternate embodiment of the present invention

Referring now to FIGS. 12–15, depicted is straight pin/belt clip securing device 30 for use in conjunction with the pager securing device 20, according to the preferred embodiment of the present invention. The straight pin/belt clip securing device 30 consists of a belt clip securing base 46 that supports a belt clip device 34, oriented along the longitudinal dimension thereof. The belt clip device 32 consists of a curved metal plate 45 that is spring biased against the belt clip securing base 41 so as to provide a clamping operation therewith. The curved metal plate 45 has a flange 44 at the end thereof to facilitate ease in sliding the belt clip device 34 over a belt, waist band or other like article. While the curved metal plate 45 design is depicted in the figures, it is envisioned that a variety of spring biased clamping devices are equally suitable for incorporation into the straight pin/belt clip securing device 30. Referring now to FIGS. 22, 23, and 24, a belt clip retaining tab 49 is attached to the belt clip securing base 46 on the side opposite the belt clip device 34. The belt clip retaining tab 49 is secured within the receiving slot 28, thereby securing the straight pin/belt clip securing attachment 30 to the securing device. The function of the belt clip retaining tab 49 in conjunction with the securing attachment receiving slot 28 will be discussed in further detail herein below.

2. Operation of the Preferred Embodiment

In accordance with the preferred embodiment of the present invention and as shown in FIG. 1, the function of the securing attachments 22 in conjunction with the securing attachment receiving slot 26 is depicted. It should be noted that the straight pin securing base 31 and the belt clip securing base 46 portions of the straight pin/belt clip securing device 30 including the straight pin retaining tab 36 and the belt clip retaining tab 49 produce an interchangeable form. Therefore, in describing the attachment of the securing attachments 22 within the securing attachment receiving slot 26 the functionality of the straight pin/belt clip securing device 30 is also being described.

Figure 13:
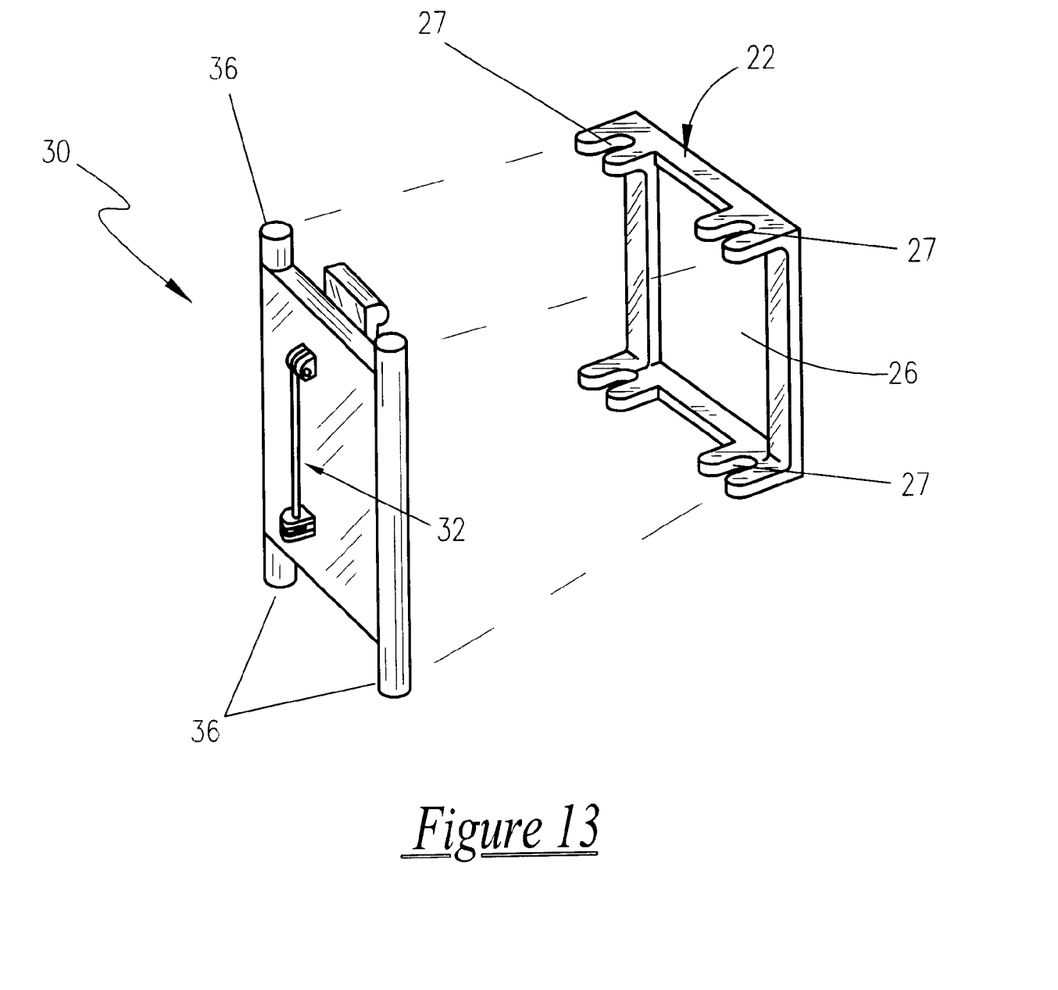
FIG. 13 is an exploded perspective view of a belt clip attachment for use with the securing attachment for personal pagers, according to the preferred embodiment of the present invention.

Referring now to FIG. 13, the dimensions formed within the securing attachment receiving slot 26 are in close tolerance with the dimensions of the straight pin securing base 31, thus producing a snug fit that provides a firm connectivity there between. As the straight pin securing base 31 is inserted within the securing attachment receiving slot 26 in a sliding motion, the straight pin securing tab 36 reaches the retaining cavity 27. It is realized that an interference fit may exist between the straight pin securing tab 36 and the holster 21 (not shown in this FIG.) as a result of the close tolerance between the securing attachment receiving slot 26 and the straight pin securing base 31. Accordingly, the straight pin securing base 31 is constructed of a generally rigid material that does exhibit some flexibility to allow for overcoming the interference fit. Once the straight pin securing tab 36 reaches the retaining cavity 27, it enters therein, retaining and securing the straight pin/belt clip securing device 30 within the securing attachment receiving slot 26, thus allowing the pager support device 20 to be suspended with the straight pin device 32.

Figures 14, 15:
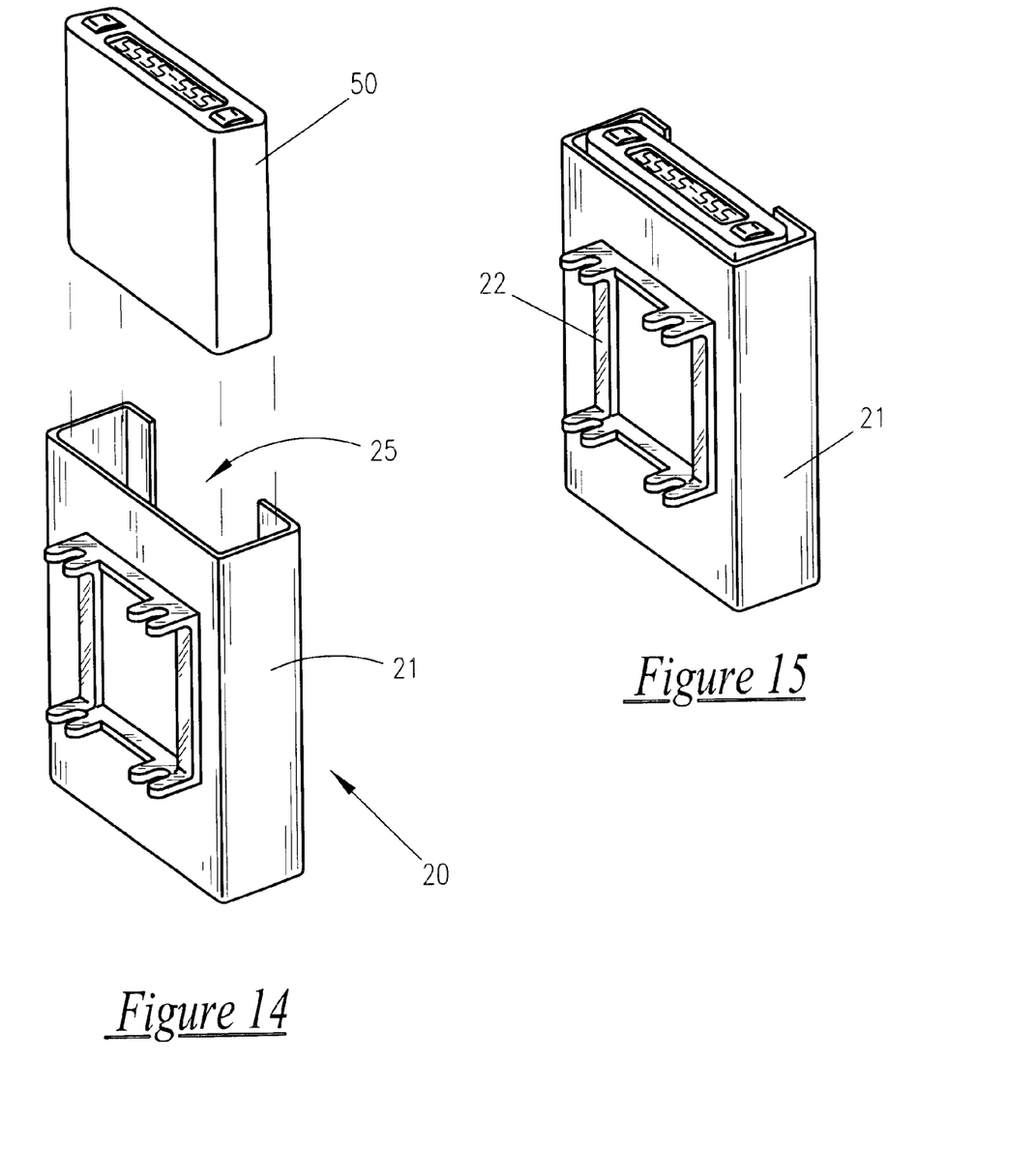
FIG. 14 is an exploded perspective view of the placement of a personal pager slidably removed from a securing device for personal pagers, according to the preferred embodiment of the present invention.
FIG. 15 is a perspective view of the securing device containing slidably therein a personal pager, according to the preferred embodiment of the present invention.

Referring now to FIGS. 14 and 15, the pager securing device 20 is depicted in its preferred use in holding and storing a personal paging device 50. The personal paging device 50 is slidably inserted within the pager receiving cavity 25 of the holster 21, thereby storing it in a position of easy and convenient access. The securing attachment 22, being the straight pin/belt clip securing device 30 allows for attaching the pager securing device 20 and thus the personal paging device 50 to the user's clothing.

Figure 16:
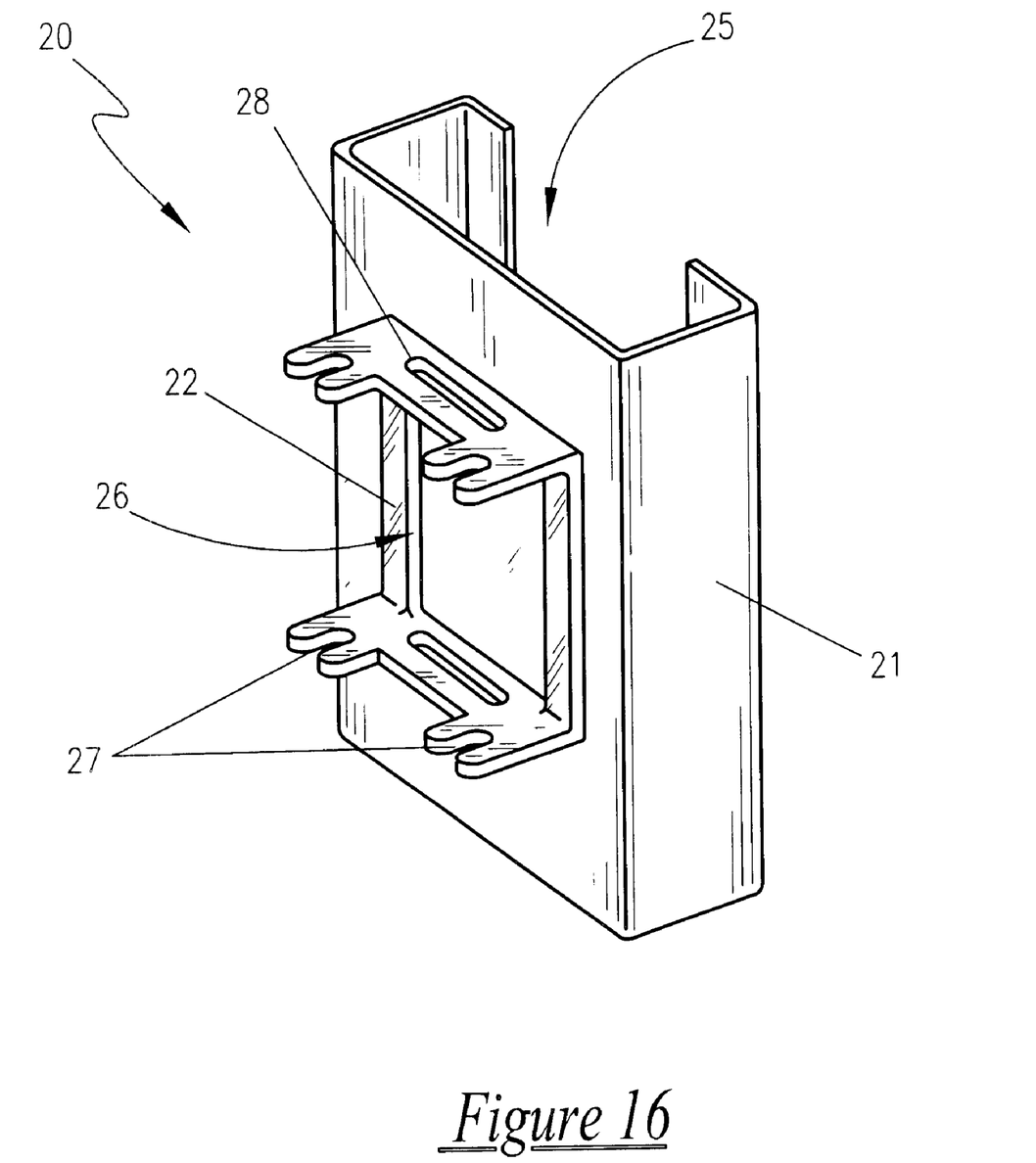
FIG. 16 is a perspective view of a securing device for personal pagers, according to the first alternate preferred embodiment of the present invention.
Figure 17:
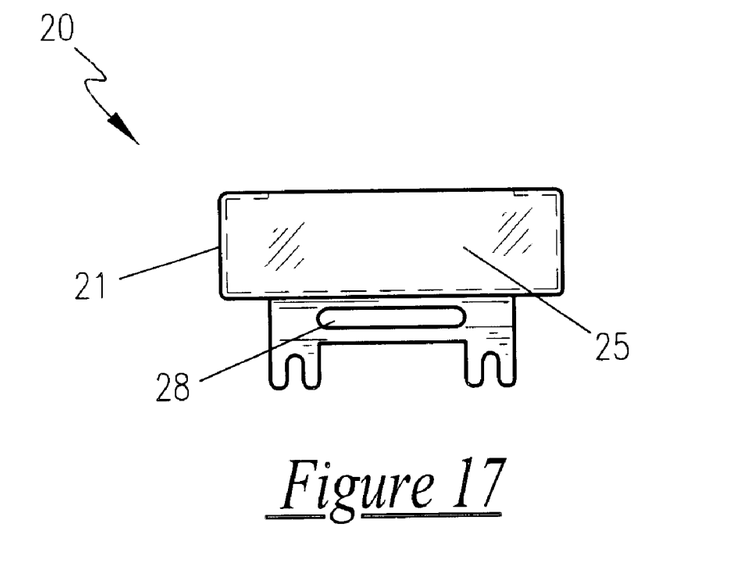
FIG. 17 is a bottom plan view of a securing device for personal pagers, according to the first alternate preferred embodiment of the present invention.
Figure 18:
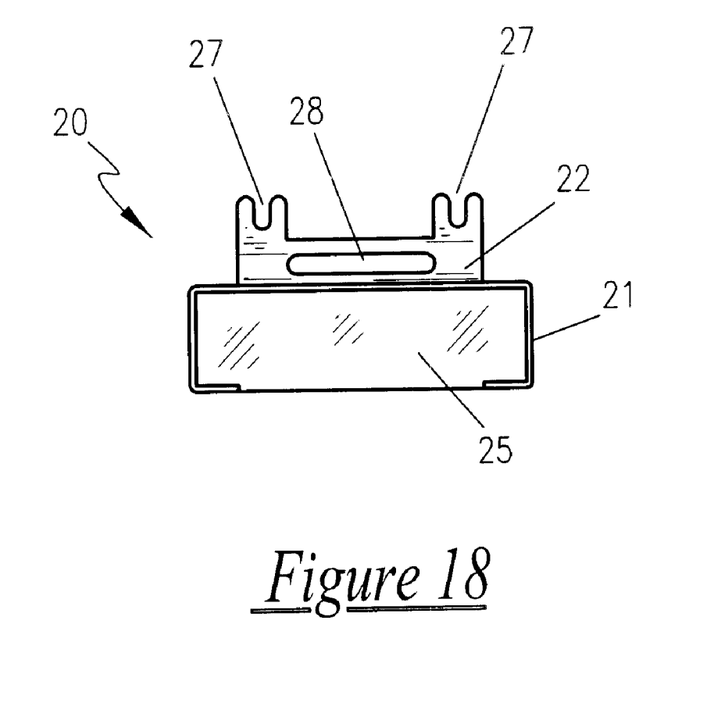
FIG. 18 is a top plan view of a securing device for personal pagers, according to the first alternate preferred embodiment of the present invention.
Figures 19, 20:
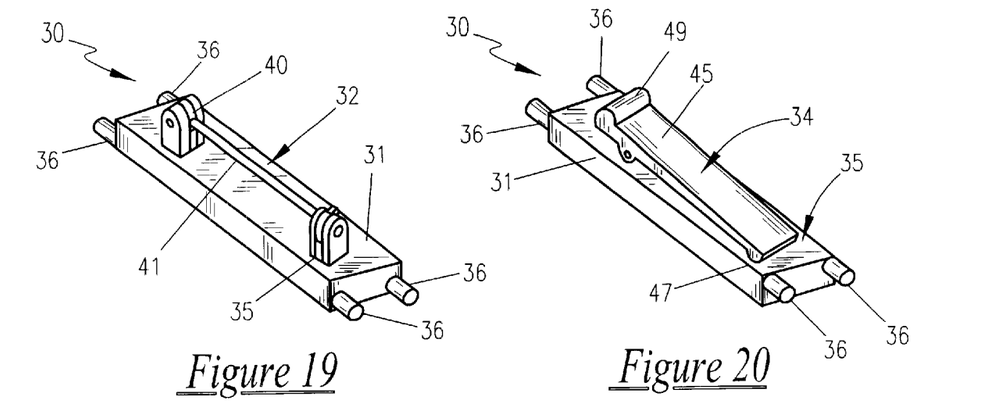
FIG. 19 is a perspective view of a straight pin attachment for use with the securing device for personal pagers, according to the first alternate preferred embodiment of the present invention.
FIG. 20 is a perspective view of a belt clip attachment for use with the securing device for personal pagers, according to the first alternate preferred embodiment of the present invention.
Figure 21:
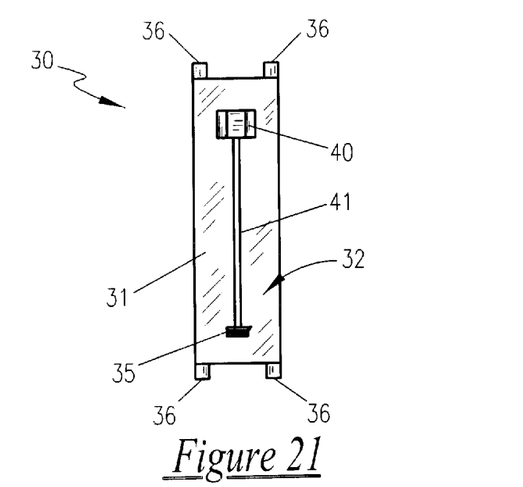
FIG. 21 is a front plan view of a straight pin attachment for use with the securing device for personal pagers, according to the first alternate preferred embodiment of the present invention.

Referring now to FIGS. 16–18, depicted is the securing device for personal pagers, hereinafter pager securing device 20, according to the first preferred alternate embodiment of the present invention. The pager securing device 20 consists of a holster 21 for securably supporting a personal pager device 50 (not shown in this figure) therein and a securing attachment 22 for attaching the holster 21 and the personal pager device 50 to an article of clothing or the like. The securing attachment 22 of the preferred embodiment has depth added to it to accommodate a receiving slot 28 in the top and bottom wall as shown in FIGS. 16 through 18 for use as described further herein below.

Referring now to FIGS. 19 through 23, the straight pin/belt clip securing device 30, according to the first preferred embodiment of the present invention has been modified slightly by angling upward the left edge of the straight pin securing base 31 and similarly the left edge of belt clip securing base 46, according to the first preferred embodiment of the present invention.

Figure 26:
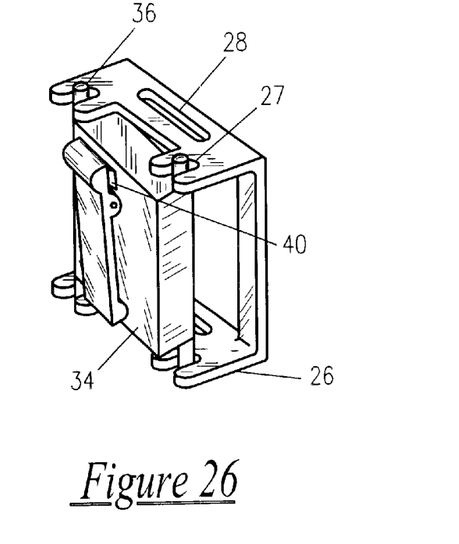
FIG. 26 shows a perspective view of a straight pin attachment installed in the securing device for personal pagers configured so that the belt clip device is the chosen attachment means, according to the second preferred alternate embodiment of the invention.
Figure 27:
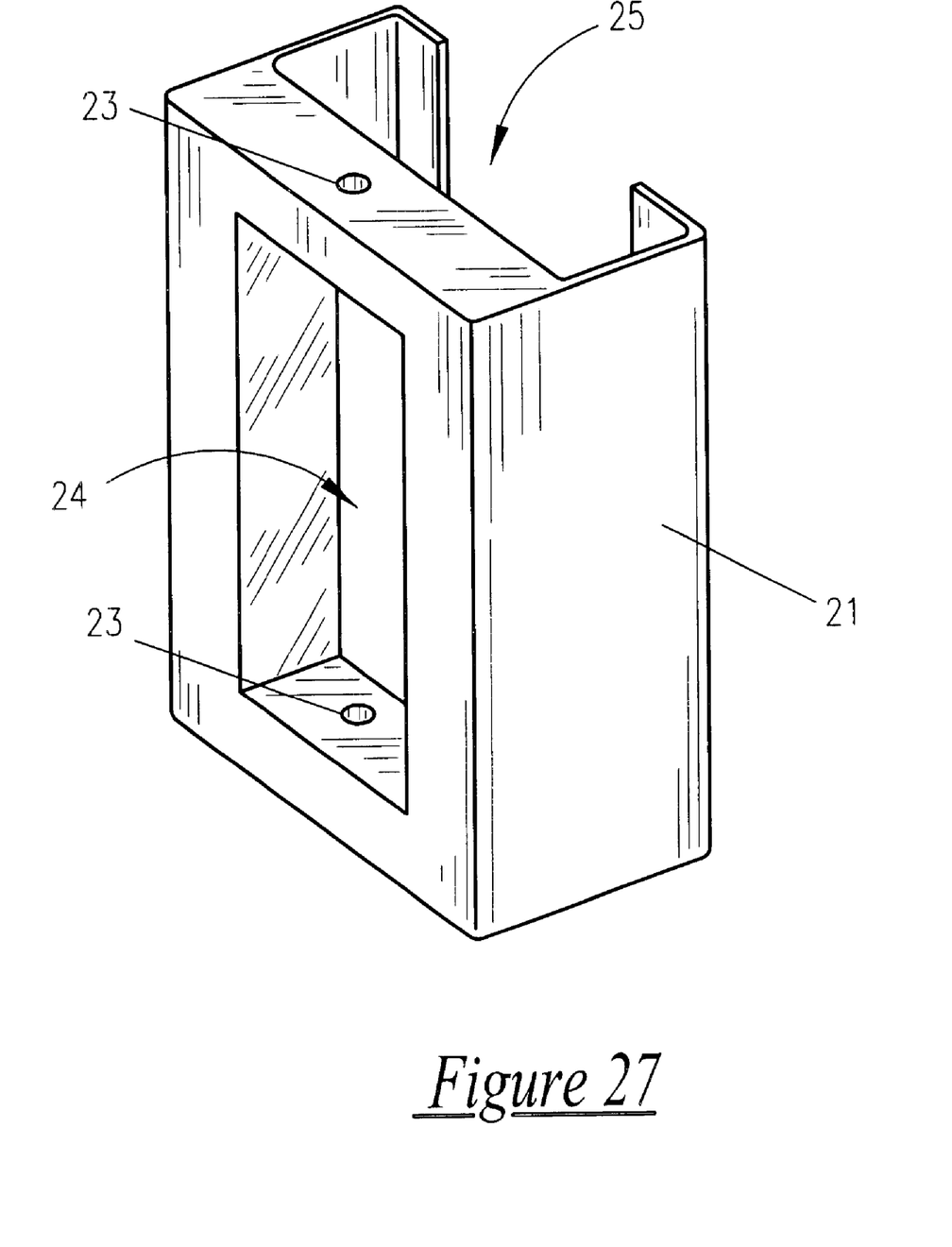
FIG. 27 is a perspective view of a securing device for personal pagers, according to the third preferred alternate embodiment of the invention.
Figure 28:
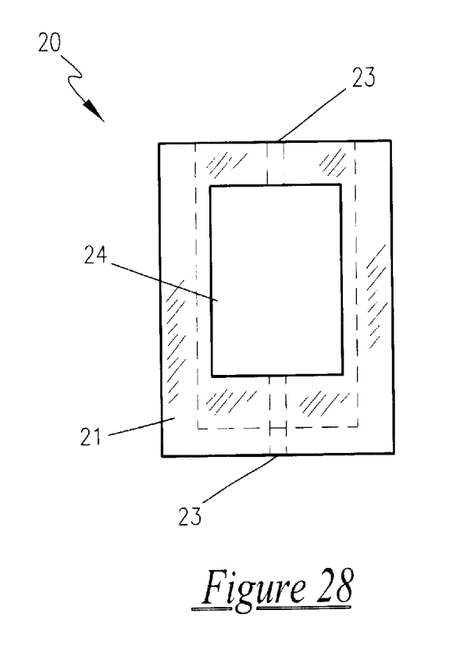
FIG. 28 is a rear plan view of a securing device for personal pagers, according to the third preferred alternate embodiment of the present invention.
Figure 29:
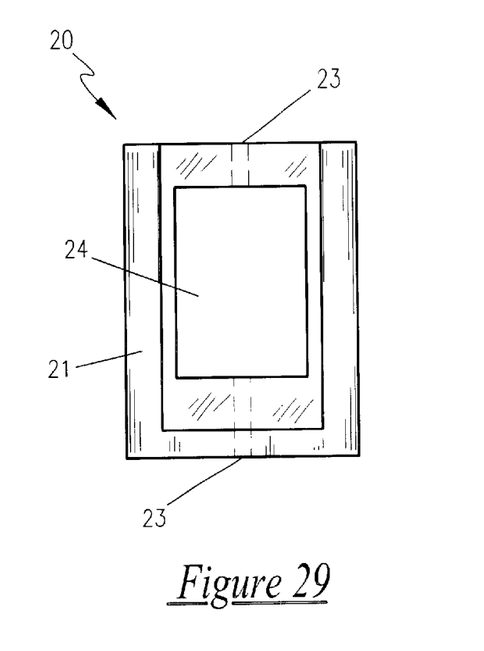
FIG. 29 a front plan view of a securing device for personal pagers, according to the third preferred alternate embodiment of the present invention.
Figure 30:
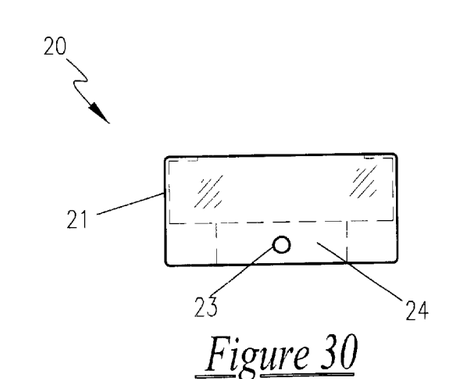
FIG. 30 a top plan view of a securing device for personal pagers, according to the third preferred alternate embodiment of the present invention.
Figure 31:
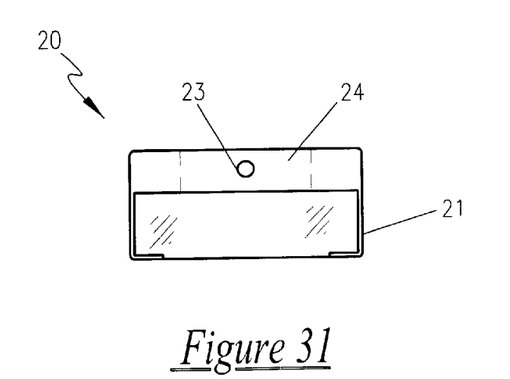
FIG. 31 a bottom plan view of a securing device for personal pagers, according to the third preferred alternate embodiment of the present invention.
Figure 32:
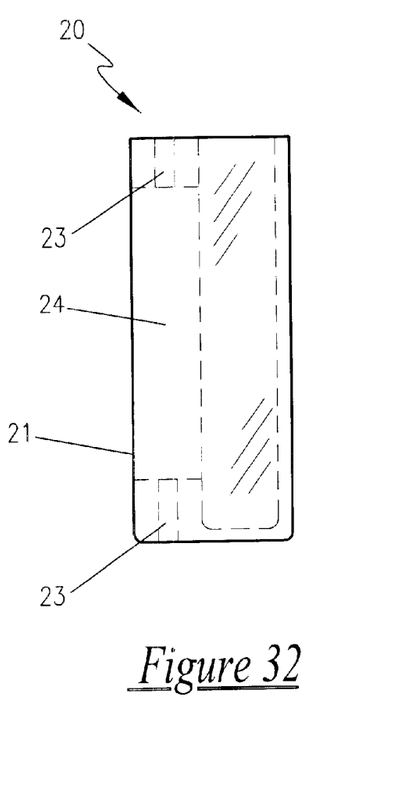
FIG. 32 a left side plan view of a securing device for personal pagers, according to the third preferred alternate embodiment of the present invention.
Figure 33:
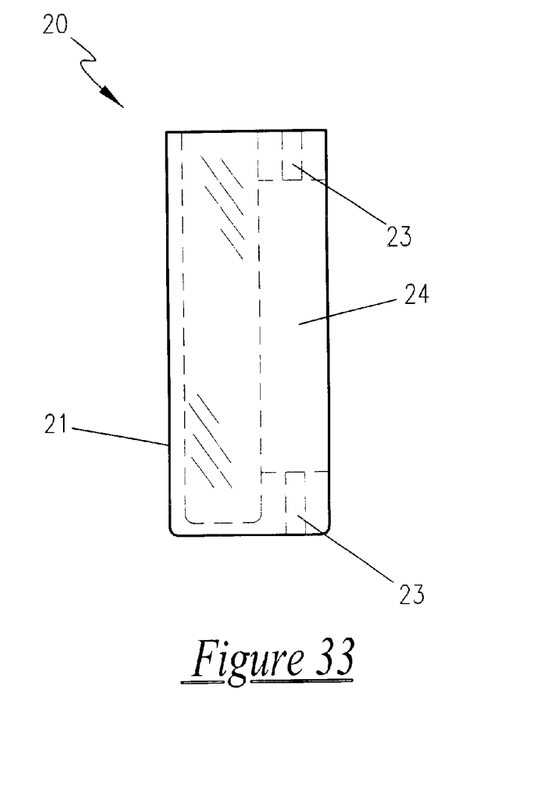
FIG. 33 is a right side plan view of a securing device for personal pagers, according to the third preferred alternate embodiment of the present invention.
Figure 34:
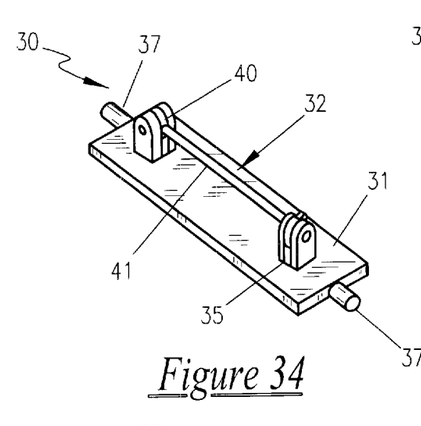
FIG. 34 is a perspective view of a straight pin attachment for use with the securing device for personal pagers, according to the third preferred alternate embodiment of the present invention.
Figure 35:
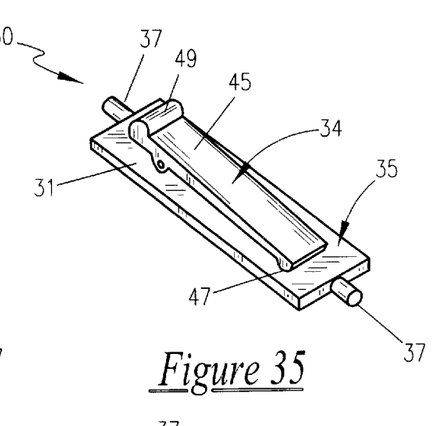
FIG. 35 is a perspective view of a belt clip pin attachment for use with the securing device for personal pagers, according to the third preferred alternate embodiment of the present invention.
Figure 36:
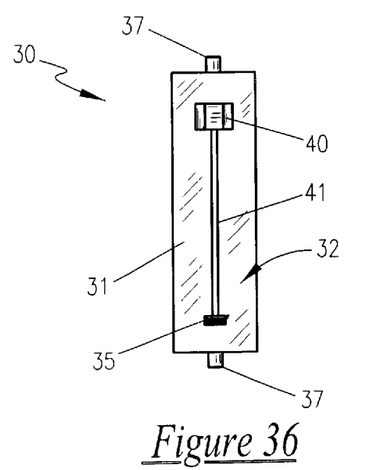
FIG. 36 is a front plan view of a straight pin attachment for use with the securing device for personal pagers, according to the third preferred alternate embodiment of the present invention.
Figure 37:
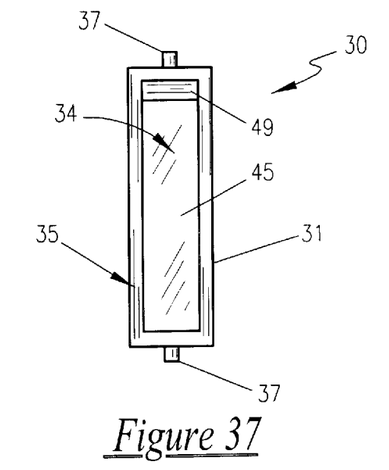
FIG. 37 is a rear plan view of a straight pin attachment for use with the securing device for personal pagers, according to the third preferred alternate embodiment of the present invention.
Figure 38:
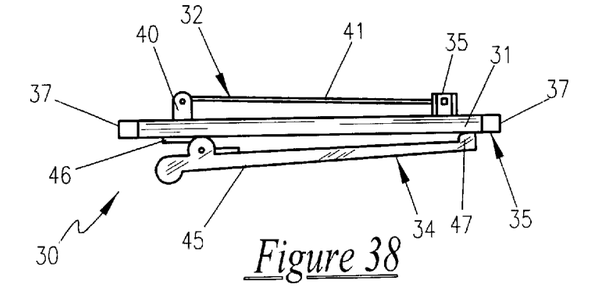
FIG. 38 is a perspective view of a belt clip attachment for use with the securing device for personal pagers, according to the third preferred alternate embodiment of the present invention.
Figure 39:
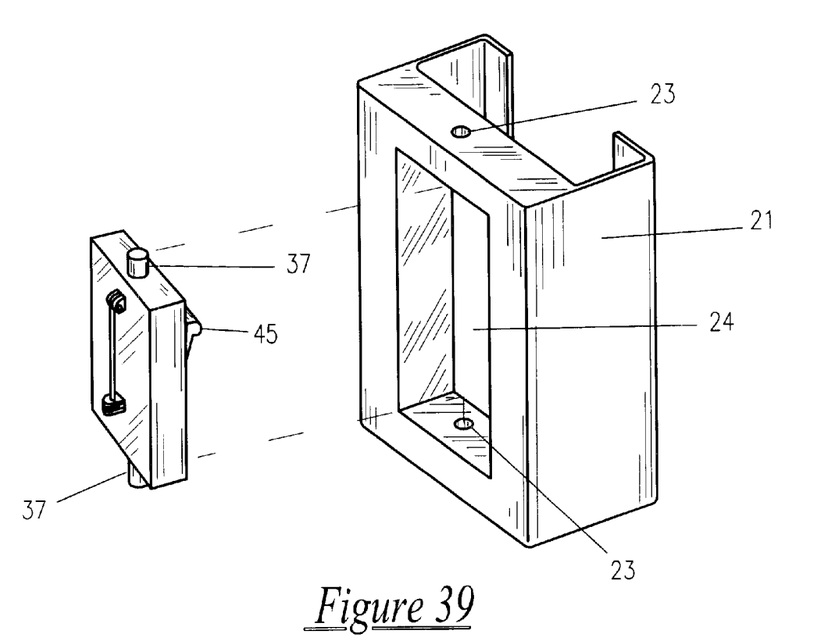
FIG. 39 is an exploded perspective view of a straight pin attachment for use with the securing device for personal pagers, according to the third preferred alternate embodiment of the present invention.
Figure 40:
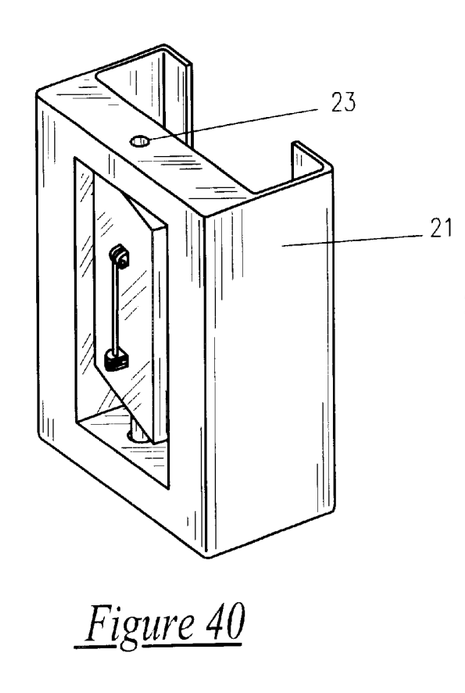
FIG. 40 is a perspective view of a straight pin attachment for use with the securing device for personal pagers, according to the third preferred alternate embodiment of the present invention.
Figure 41:
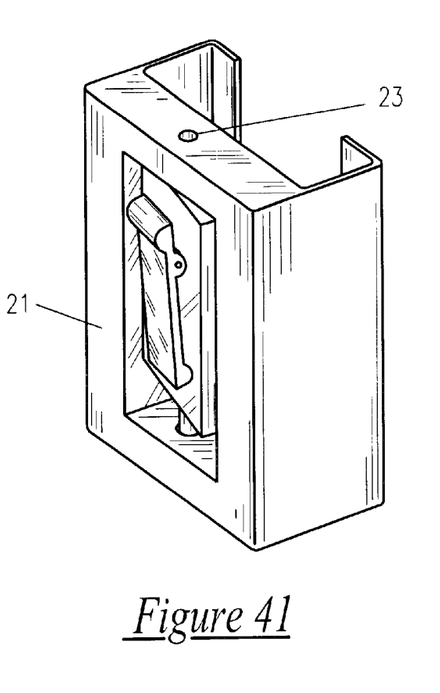
FIG. 41 is a perspective view of a belt clip attachment for use with the securing device for personal pagers, according to the third preferred alternate embodiment of the present invention.

Referring to FIG. 24, shown are retaining tabs 36 located on the left and right edge of straight pin/belt clip securing device 30 being received by the retaining cavity 17. Retaining tabs 36 of straight pin/belt clip securing device 30 are received by the retaining cavity 27 and secured therein by an interference type fit. In this configuration the user is able to attach the pager securing device 20 to their clothing with straight pin device 32. The purpose of the angled surfaces of straight pin securing base 31 and belt clip securing base 41 is now evident as shown in FIG. 24. Due to the orientation of straight pin/belt clip securing device 30 when coupled to the securing attachment 22, the faces of base 31 and 41 had to be angled to bring the plane of base 31 and 41 to the plane of the clothing of the user. To change the configuration so that the user can secure pager securing device 20 to their clothing using belt clip device 34, retaining tabs 36 would be unseated from the rotating cavity 27. The straight pin/belt clip securing device 30 would then be rotated 180° until retaining tabs 36 are seated in the retaining cavity 27 as shown in FIG. 26.

As with the preferred embodiment, the securing attachment 22, being the straight pin/belt clip securing device 30 interchangeably connects to the personal paging device 50 via the securing attachment receiving slot 26 and allows for attaching the personal paging device 50 directly to the user's clothing in a position of easy and convenient access.

Referring now to FIGS. 27 through 41, depicted is a second preferred alternate embodiment of the present invention wherein interchangeable securing attachment 22 is eliminated and it's functionality replaced by a rectangular cavity 24 recessed into the rear wall of holster 21 of pager securing device 20. Of course, the rear wall of pager securing device 20 would have to be sufficiently thickened to accommodate the deeper receiving cavity 24. A small aperture 23 of sufficient depth would be centrally drilled into the top and bottom edges of the wall forming receiving cavity 24. Retaining tabs 36 would be eliminated and replaced by two solid pins 37 interference fitted into apertures centrally located in the top and bottom edges of straight pin/belt clip securing device 30. Pins 37 would then be received by apertures 23 and straight pin securing device 30 would be free to rotate along pins 37 longitudinal axis. A user simply would rotate straight pin/belt clip securing device 30 about pins 37 longitudinal axis until the straight pin/belt clip securing device 30 is in the desired position. The user would then simply drop personal paging device (not shown in these figures) into pager receiving cavity 25 of holster 21. The personal paging device would prevent any further rotation of straight pin/belt clip securing device 30 because receiving cavity 24 is open to pager receiving cavity 25.

While the preferred embodiments of the invention have been shown, illustrated, and described, it will be apparent to those skilled in this field that various modifications may be made in these embodiments without departing from the spirit of the present invention. It is for this reason that the scope of the invention is set forth in and is to be limited only by the following claims.

What is claimed is:

1. A securing attachment for use in conjunction with a pager securing device, said securing attachment comprising:

a belt clip securing attachment consisting of a belt clip securing base that supports a belt clip device oriented along a longitudinal dimension of said belt clip securing base, said belt clip device having a curved metal plate spring biased against said belt clip securing base so as to provide a clamping force there between;

a straight pin securing device affixed to said belt clip securing attachment opposite to said belt clip device in a manner such that removable attachment can be by either said straight pin securing attachment or by said belt clip securing attachment alternately, wherein said straight pin securing device is further comprised of retaining tabs located on a left and right edge of said straight pin securing device and being received by a retaining cavity formed within said securing attachment and secured therein in an interference type fit.

2. The securing attachment of claim 1, wherein said pager securing device for use with said securing attachment comprises:

a generally rectangular holster forming a hollow interior cavity for receiving and storing a personal paging device.

3. The securing attachment of claim 2, wherein said holster further comprises an attachment receiving slot for receiving said straight pin securing device slidably therein.

4. The securing attachment of claim 2, wherein said holster further comprises small apertures for providing a retaining force for securing solid pins of said straight pin securing device within said attachment receiving slot.

* * * * *